July 3, 1956
W. H. SCHUTMAAT
2,752,931
AUTOMATIC SHUT-OFF FOR REGULATOR VALVES AND THE LIKE
Filed Aug. 31, 1953
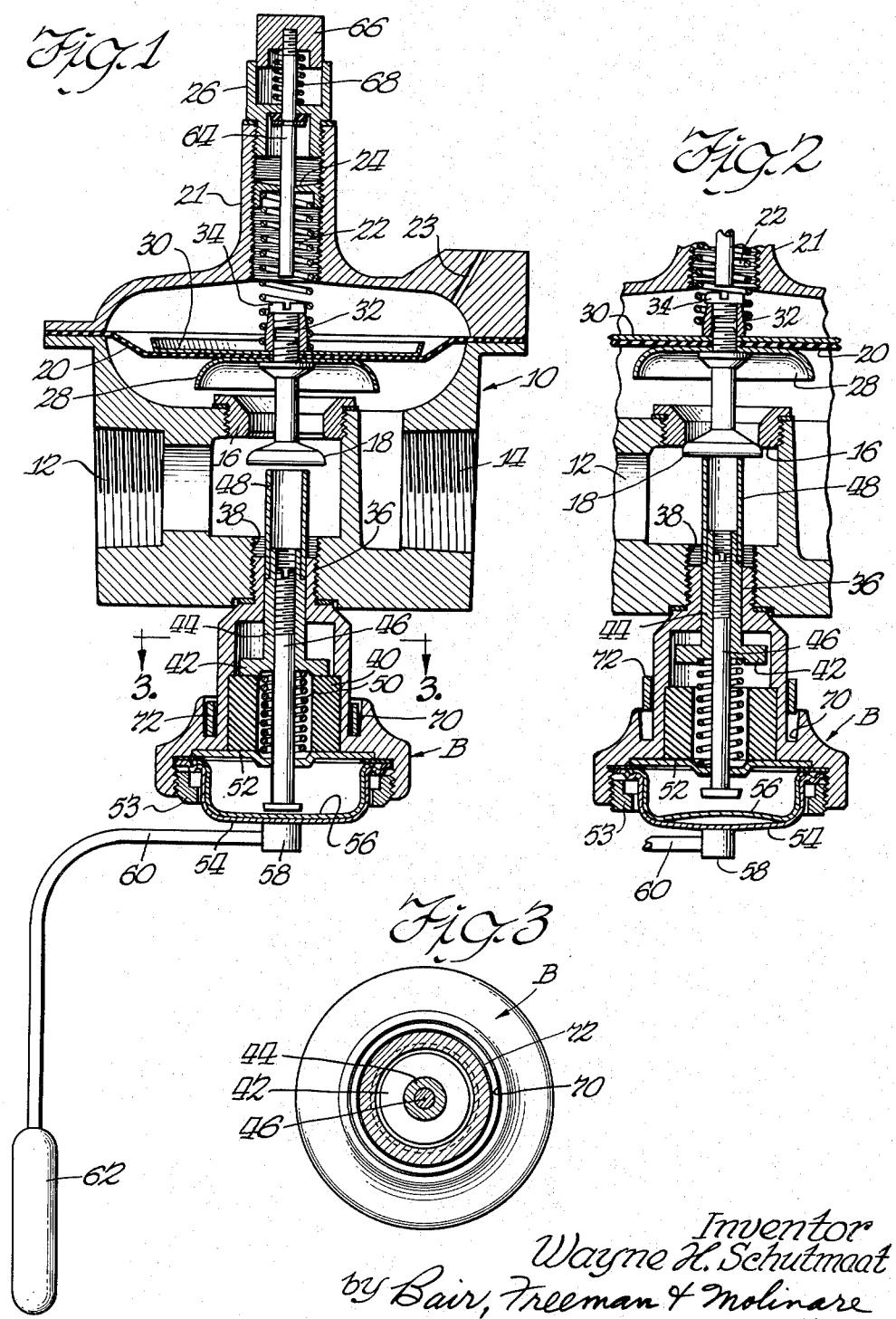
Inventor
Wayne H. Schutmaat
by Bair, Freeman & Molinare
Attys.

United States Patent Office 2,752,931
Patented July 3, 1956

2,752,931

AUTOMATIC SHUT-OFF FOR REGULATOR VALVES AND THE LIKE

Wayne H. Schutmaat, Dunlap, Ind., assignor to Penn Controls, Inc., Goshen, Ind., a corporation of Indiana Application August 31, 1953, Serial No. 377,282

7 Claims. (Cl. 137—80)

This invention relates to an automatic safety shut-off which may be mounted on pressure regulators or other types of valves and which is operable upon a predetermined condition occurring, such as excess temperature or pressure, to move the regulator or other valve to shut-off position requiring manual reset before the valve can be put back into operation.

One object of the invention is to provide a comparatively simple and inexpensive safety shut-off unit adapted to be connected to the body of a regulator or other type of valve or other control device, said unit being self-contained and having means to coact with the valve in the valve body and move it to the off position upon occurrence of a predetermined condition, the valve or shut-off unit then keeping the valve in that position until the device is reset, whereupon it is again ready for an automatic shut-off operation when the predetermined condition reoccurs.

Another object is to provide a shut-off unit in the form of a body having therein a shut-off element projectable from the body to engage a valve plug or the like and seat it, a spring within the body being operable to perform this function, and means being provided to lock the spring against operation, such means being specifically an armature and a magnet which are engaged with each other.

A further object is to provide means for relatively disengaging the magnet and armature so that the spring can act in its intended capacity to close the valve or perform whatever function it is designed for, manually operable reset means being provided to open the valve again and at the same time re-engage the magnet and armature so that they are reset for a subsequent safety operation.

Still a further object is to provide a simple means to indicate the operation of the shut-off unit, this means being provided in the form of a groove around the body of the unit in which there is a ferrous ring, and the groove being positioned to only receive this ring when the armature is against the magnet and to permit the change in magnetic flux when the armature is spaced from the magnet to raise the ring against the action of gravity and retain it in an elevated position where it is observable for indicating purposes.

With these and other objects in view my invention consists in the construction, arrangement and combination of the various parts of my automatic shut-off for regulator valves and the like whereby the objects contemplated are attained, as hereinafter more fully set forth, pointed out in my claims and illustrated in the accompanying drawings, wherein:

Figure 1 is a cross sectional view of a regulator valve to which my automatic shut-off has been applied, the parts being shown in the normal operating position, that is with the regulator valve open and regulating the flow of gas or the like therethrough.

Figure 2 is a similar sectional view of a portion of Figure 1 showing the automatic shut-off in the tripped position; and Figure 3 is a horizontal detail sectional view on the line 3—3 of Figure 1.

On the accompanying drawing I have used the reference numeral 10 to indicate a valve body, such as one for a pressure regulator or any other type of valve. The valve body illustrated has an inlet 12 and an outlet 14 between which are located a seat 16. A valve plug 18 is adapted to cooperate with the seat 16 in the regulation of the flow of gas or the like through the valve body 10, and is under control of a diaphragm 20 which is responsive to the outlet pressure within the valve body.

The diaphragm 20 has its peripheral edge sealed with relation to the body 10 by the usual diaphragm cover 21 in which is a spring 22 that may be adjusted by the threaded element 24 for regulating the pressure at which the regulating valve operates.

A closure plug 26 is threaded into the cover 21 to enclose the adjusting element 24, and the cover 21 is vented as at 23. Discs 28 and 30 are provided on opposite sides of the diaphragm 20 and retained in position by a nut 32 and a closure nut 34.

My automatic shut-off unit includes a body B which is adapted to be mounted in depending relation to the valve body 10 by means of a threaded portion 36 screwed into threads 38 of the body 10. Within the body B a tubular or annulus-shaped permanent magnet 40 is located. An armature 42 of disc-like character is adapted to coact therewith and has a sleeve portion 44 into which a stem 46 is threaded. A tube 48 forms an extension of the sleeve 44 and the entire assembly of 42, 44, 46 and 48 serves as a shut-off element as will hereinafter appear.

A spring 50 is held in position by a plate 52 which also holds the magnet 40 in position and biases the armature 42 upwardly. A power unit housing 54 is held in position by a threaded ring 53 against the plate 52 to in turn hold it in position. This housing 54 has a diaphragm 56 therein and a fitting 58 is secured to the housing and has a capillary tube 60 extending therefrom to a bulb 62 so that the assemblage 54–56–58–60–62 forms a temperature responsive sensing and power unit wherein an increase in temperature will move the diaphragm 56 upwardly as shown in Figure 2 for lifting the armature 42 away from the magnet 40 by engagement with the stem 46. Obviously the housing 54–56 may be subject to pressure as distinguished from temperature of any other type of power unit may be provided for manually or automatically moving the stem 46 upwardly for tripping the valve as will hereinafter appear.

Resetting means is provided for resetting the parts from the Figure 2 position to the Figure 1 position and consists of a stem 64 to engage the screw 34, the stem being connected with a reset button 66 normally held in the raised position shown in Figure 1 by a spring 68 in the closure plug 26.

Indicating means is provided for my automatic shut-off unit to indicate when it has tripped the valve. This consists of a groove 70 in the body B and a ring 72 of ferrous material therein, the groove being slightly deeper than the ring. The operation of this device will be described later.

Practical operation

In the operation of my automatic shut-off for regulator valves and the like, assuming the parts in the position shown in Figure 1, the automatic shut-off unit is inoperative by reason of the magnet 40 holding the armature 42 in the lowered position. The valve plug 18 is accordingly free to modulate in response to outlet pressure against the diaphragm 20 balanced by the spring 22 at whatever adjustment setting it happens to be.

Upon excess temperature affecting the bulb 62 the diaphragm 56 will bow to the position shown in Figure 2, thus elevating the stem 46 and the armature 42. As soon as the armature leaves the magnet 40 and is spaced a sufficient distance therefrom that the magnetic pull is no longer greater than the force of the spring 50, the spring will expand and move the assemblage 42, 44, 46, 48 and thereby the valve 18 upwardly to seated position against the seat 16 as shown in Figure 2. The spring 50 will retain the valve seated and will be aided by the incoming pressure from the inlet 12 until such time as reset is effected.

To effect reset, the reset button 66 is depressed whereupon the stem 64 will engage the screw 34 and through it will open the valve 18 relative to its seat 16 and at the same time move the shut-off element downwardly until the magnetic pull of the magnet 40 on the armature 42 snaps the armature to the reset position shown in Figure 1.

The magnet 40 is not axially magnetized but is magnetized at opposite sides of the diameter of the annulus and also its north and south poles are at only one axial end thereof. The magnet is installed with this pole end up. When the valve is tripped as in Figure 2, the magnetic flux pattern changes as the magnet 40 is no longer shorted by the armature 42. The poles of the magnet will then attract the ring 72 and lift it and tend to center it relative to the upper face of the magnet. It will, however, float at the slightly lower-than-centered position shown in Figure 2 as the force of gravity must be overcome by the magnetic lifting force. In this position it is observable beyond the top of the annular groove 70 and serves as an indicator. Upon reset of the valve, the armature shorts the magnet, thus sharply reducing stray flux density and as a result, the ring drops by gravity.

The purpose of threading the stem 46 into the sleeve 44 is to provide for adjustment of the position of the lower end of the stem in relation to the diaphragm 56. The desired trip point may thus be preset before assembly of the parts.

The foregoing described invention, it will be obvious, serves as a high limit shut-off. On an increase in heat on the thermal responsive bulb, the diaphragm 56 exerts a force on the bottom of the stem 46 thus directly creating a gap between the armature disc 42 and the magnet 40. When this gap is great enough, the spring force overcomes the holding force of the magnet and the mechanism triggers off to strike the bottom of the regulator valve 18, driving it against the seat 16 and shutting the valve off. The reset mechanism is a manual push-pin arrangement which brings the armature disc back into contact with the magnet.

The thermal responsive element 62 can be placed in a bonnet of a furnace for a high limit shut-off, inside or against the tank of a hot water heater for the same effect, or many other types of safety shut-off installations are possible.

Some changes may be made in the construction and arrangement of the parts of my automatic shut-off for regulator valves and the like without departing from the real spirit and purpose of my invention, and it is my intention to cover by my claims any modified forms of structure or use of mechanical equivalents which may be reasonably included within their scope.

I claim as my invention:

1. In a device of the class described, a shut-off unit for a valve comprising a body, a shut-off element projectable from said body, means within said body biasing said shut-off element to shut-off position, automatic means to normally retain said shut-off element against the bias of said biasing means comprising a magnet and an armature, which when in engagement overcome the bias of said biasing means, a condition responsive means to operate said automatic means, and means to indicate when said shut-off element has operated comprising said body having an upwardly opening groove surrounding said magnet, a ferrous ring in said groove, said groove being positioned to wholly receive said ring when the armature is against the magnet and to permit the change in magnetic flux when the armature is spaced from the magnet to raise the ring against the action of gravity and retain it in an elevated position with the upper edge thereof appearing above said groove.

2. In an automatic valve shut-off device, a body, a shut-off element projectable from said body, a spring tending to cause such projection, means to normally retain said shut-off element against the bias of said spring comprising a magnet and an armature in engagement, condition responsive means to relatively separate said armature and said magnet, manual means to reset said shut-off element by re-engagement of said magnet and armature, and means to indicate when said shut-off element has operated comprising said body having an upwardly opening groove surrounding said magnet and a ferrous ring in said groove so positioned with respect to said magnet that a shift in the flux path thereof causes said ring to be elevated relative to said groove.

3. In an automatic shut-off for valves and the like, a shut-off unit, a shut-off element projectable from said shut-off unit, means within said shut-off unit biasing said shut-off element to shut-off position, means to normally retain said shut-off element against the bias of said biasing means comprising a magnet and an armature, one stationary relative to the body and the other carried by said shut-off element, said magnet having its pole faces uppermost, said magnet and armature when in engagement overcoming the bias of said biasing means, means to automatically overcome the pull of the magnet on the armature to thereby permit the biasing means to function comprising an expansible pressure chamber having a part movable in response to a build-up of pressure therein, said movable part engaging said shut-off element to move it toward valve closing position, means for resetting said shut-off means with said magnet and armature in engagement, and means to indicate when said shut-off element has operated comprising an upwardly opening groove formed exteriorly of said unit adjacent said magnet, a ferrous ring in said groove, said groove being positioned to wholly receive said ring when the armature is against the magnet and to permit the change in magnetic flux when the armature is spaced from the magnet to raise the ring against the action of gravity.

4. A shut-off unit comprising a body, a magnet therein, a shut-off element projectable from said body, a spring to effect such projection, an armature carried by said shut-off element and engageable with said magnet against the force of said spring, power means to engage said shut-off element and move it against the force of said magnet on said armature to overcome such force and thereby permit said spring to project the shut-off element from said body to shut-off position, and means for indicating the position of said shut-off element comprising an annular upwardly opening groove in said body surrounding said magnet, and a ferrous ring loosely mounted therein, said groove and ring being positioned to permit the ring to rest on the bottom of the groove when the armature is against the magnet and to rise partially out of the groove when the armature is spaced from the magnet.

5. A shut-off unit comprising a body, a magnet therein, a shut-off element projectable from said body, a spring to effect such projection, an armature carried by said shut-off element and engageable with said magnet against the force of said spring, power means to engage said shut-off element and move it against the force of said magnet on said armature to overcome such force and thereby permit said spring to project the shut-off element from said body to shut-off position, and means for indicating the position of said shut-off element comprising an annular upwardly opening groove in said body surrounding said magnet and a ferrous ring loosely mounted therein and so positioned with respect to said magnet that a shift in the flux path thereof causes said ring to be elevated relative to said groove 6. In a device of the class described, a housing of non-magnetic material, an armature and a magnet therein and engageable and disengageable relative to each other, and a magnetic indicator exterior of said housing and movable relative thereto, said indicator being normally spaced from a pole of said magnet and biased to that position so as to occupy it when said armature and magnet are in engagement and moved to a second position adjacent said pole by magnetic attraction when said armature is disengaged from said magnet.

7. In a device of the class described, a housing of non-magnetic material, an armature and a magnet therein and engageable and disengageable relative to each other, and a magnetic indicator exterior of said housing and movable relative thereto, said indicator being normally spaced from a pole of said magnet by gravity when said armature and magnet are in engagement and moved upwardly against the force of gravity to a position adjacent said pole by magnetic attraction when said armature is disengaged from said magnet.

References Cited in the file of this patent

UNITED STATES PATENTS

| | | |
|---|---|---|
| 626,594 | Chapman | June 6, 1899 |
| 2,071,215 | Petersen | Feb. 16, 1937 |
| 2,326,487 | Overbeke | Aug. 10, 1943 |
| 2,579,723 | Best | Dec. 25, 1951 |
| 2,591,897 | Weber | Apr. 8, 1952 |
| 2,626,633 | Wilson | Jan. 27, 1953 |
| 2,638,582 | Urso | May 12, 1953 |